US007849087B2

(12) United States Patent
Goutte et al.

(10) Patent No.: US 7,849,087 B2
(45) Date of Patent: Dec. 7, 2010

(54) INCREMENTAL TRAINING FOR PROBABILISTIC CATEGORIZER

(75) Inventors: Cyril Goutte, le Versoud (FR); Eric Gaussier, Eybens (FR)

(73) Assignee: Xerox Corporation, Norwalk, CT (US)

( * ) Notice: Subject to any disclaimer, the term of this patent is extended or adjusted under 35 U.S.C. 154(b) by 1561 days.

(21) Appl. No.: 11/170,019

(22) Filed: Jun. 29, 2005

(65) Prior Publication Data
US 2007/0005340 A1   Jan. 4, 2007

(51) Int. Cl.
G06F 7/00 (2006.01)
G06F 17/30 (2006.01)
(52) U.S. Cl. .......................................... 707/737; 704/9
(58) Field of Classification Search ........................ None
See application file for complete search history.

(56) References Cited

U.S. PATENT DOCUMENTS 7,080,063 B2 *   7/2006  Campos et al. ................. 707/2
7,269,546 B2 *   9/2007  Stensmo ......................... 704/9
7,469,246 B1 *  12/2008  Lamping ......................... 707/6
2002/0059219 A1 *  5/2002  Neveitt ............................ 707/5

OTHER PUBLICATIONS

Yang et al., "A Comparative Study on Feature Selection in Text Categorization," In *Proceedings of ICML-97, 14th International Conference on Machine Learning*, pp. 412-420, 1997.
Gaussier et al., "A Hierarchical Model for Clustering and Categorising Documents," In *Advances in Information Retrieval—Proceedings of the 24th BCS-IRSG European Colloquium on IR Research*, vol. 2291 of *Lecture Notes in Computer Science*, pp. 229-247. Springer, 2002.
U.S. Appl. No. 10/774,966, filed Feb. 9, 2004, Goutte et al.

* cited by examiner

*Primary Examiner*—Sathyanarayan Pannala
(74) *Attorney, Agent, or Firm*—Fay Sharpe LLP

(57) ABSTRACT

A probabilistic document categorizer has an associated vocabulary of words and an associated plurality of probabilistic categorizer parameters derived from a collection of documents. A new document is received. The probabilistic categorizer parameters are updated to reflect addition of the new document to the collection of documents based on vocabulary words contained in the new document, a category of the new document, and a collection size parameter indicative of an effective total number of instances of vocabulary words in the collection of documents.

19 Claims, 2 Drawing Sheets

US 7,849,087 B2

INCREMENTAL TRAINING FOR PROBABILISTIC CATEGORIZER

INCORPORATION BY REFERENCE

The following copending, commonly assigned applications: Categorization Including Dependencies Between Different Category Systems (Ser. No. 11/170,033 filed Jun. 29, 2005); Method for Multi-Class, Multi-Label Categorization Using Probabilistic Hierarchical Modeling (Ser. No. 10/774,966 filed Feb. 9, 2004); are herein incorporated by reference.

BACKGROUND

Automated categorization of documents is a powerful tool for developing large document databases for businesses, organizations, and so forth. Typically, automated categorization involves selecting suitable categories and then training the categorizer respective to an initial set of training documents that are pre-annotated with suitable category labels. The training involves analyzing the pre-annotated documents to identify a vocabulary of words that are indicative of the various categories. Once trained, the categorizer can receive a new document, identify the vocabulary words in that new document, and annotate the document with one or more appropriate category labels based on the identified vocabulary words.

For example, one class of probabilistic categorizers are the Naïve Bayes-type categorizers, which employ Bayesian conditional vocabulary word probabilities, assuming statistical independence of the conditional probabilities. Another class of categorizers are the probabilistic latent categorizers (PLC), which are described for example in "Method for Multi-Class, Multi-Label Categorization Using Probabilistic Hierarchical Modeling" (Ser. No. 10/774,966 filed Feb. 9, 2004), and in Eric Gaussier et al., "A hierarchical model for clustering and categorising documents", in "Advances in Information Retrieval—Proceedings of the 24th BCS-IRSG European Colloquium on IR Research", vol. 2291 of Lecture Notes in Computer Science, pages 229-47 (Springer, 2002), Fabio Crestani, Mark Girolami, and Cornelis Joost van Rijsbergen, editors. The PLC approach employs a co-occurrence categorization model.

The ability of such probabilistic categorizers to accurately assign category labels to new documents is determined in part by the quality of the training, which in turn depends upon the quantity of the initial training documents as well as upon how representative those documents are of the categories of the categorization system. If, for example, the training documents do not adequately represent certain categories, then the resulting trained categorizer will be less reliable in assigning documents to those categories. Since the initial training documents are pre-annotated, reliability can also be compromised if some of the training documents are improperly categorized.

Moreover, even if the initial collection of training documents is large and adequately representative of the categories of the categorization system, inaccuracies can still arise over time due to drift. For example, as a business develops over time, it may shift its focus from one line of products to another. Similarly, a field of knowledge evolves over time as researchers substantially solve certain problems and move onto new challenges. In contrast, the categorizer is static, being based entirely upon the initial training using the initial collection of documents, and hence does not evolve to track drift in document characteristics over time. Drift can involve changes in the relative frequencies of occurrences of certain vocabulary words in documents of certain categories. Drift can also involve the introduction of entirely new words into the language of documents of certain categories. These new words may be highly indicative of the category, but are not part of the categorization vocabulary since the new words did not exist, or were very infrequently used, at the time of the initial training.

Various approaches have been used to address inadequacies in the initial training and to address drift over time. In some categorization systems, human review of the automated categorization is incorporated, so as to allow manual correction where the trained categorizer erroneously categorizes a document. Such an approach relying upon human intervention is unsatisfactory for maintaining large document databases. Alternatively, the categorizer can be retrained occasionally to account for drift in the documents over time. This approach is computationally intensive, and also requires substantial human intervention since a new collection of training documents must be gathered and pre-annotated.

BRIEF DESCRIPTION

Some aspects of the present disclosure in some embodiments thereof include a method for operating a probabilistic document categorizer having an associated vocabulary of words and an associated plurality of probabilistic categorizer parameters derived from a collection of documents. A new document is received. The probabilistic categorizer parameters are updated to reflect addition of the new document to the collection of documents based on vocabulary words contained in the new document, a category of the new document, and a collection size parameter indicative of an effective total number of instances of vocabulary words in the collection of documents.

Some aspects of the present disclosure in some embodiments thereof include an apparatus for categorizing documents. The apparatus has an associated vocabulary of words and an associated plurality of probabilistic categorizer parameters derived from a collection of documents. A probabilistic categorizer annotates a new document with a category based on vocabulary words contained in the new document and the plurality of probabilistic categorizer parameters. A probabilistic categorizer model updater updates the probabilistic categorizer parameters to reflect addition of the new document to the collection of documents. The updating is based on the vocabulary words contained in the new document, the annotated category of the new document, and a collection size parameter indicative of an effective total number of instances of vocabulary words in the collection of documents.

Some aspects of the present disclosure in some embodiments thereof include a method for operating a probabilistic document categorizer having an associated vocabulary of words and an associated plurality of probabilistic categorizer parameters computed as ratios of selected frequencies of vocabulary words in a collection of documents. A new document is received. The probabilistic categorizer parameters are updated without recomputing the frequencies of vocabulary words in the collection of documents to reflect addition of the new document to the collection of documents.

DETAILED DESCRIPTION

Figure 1:
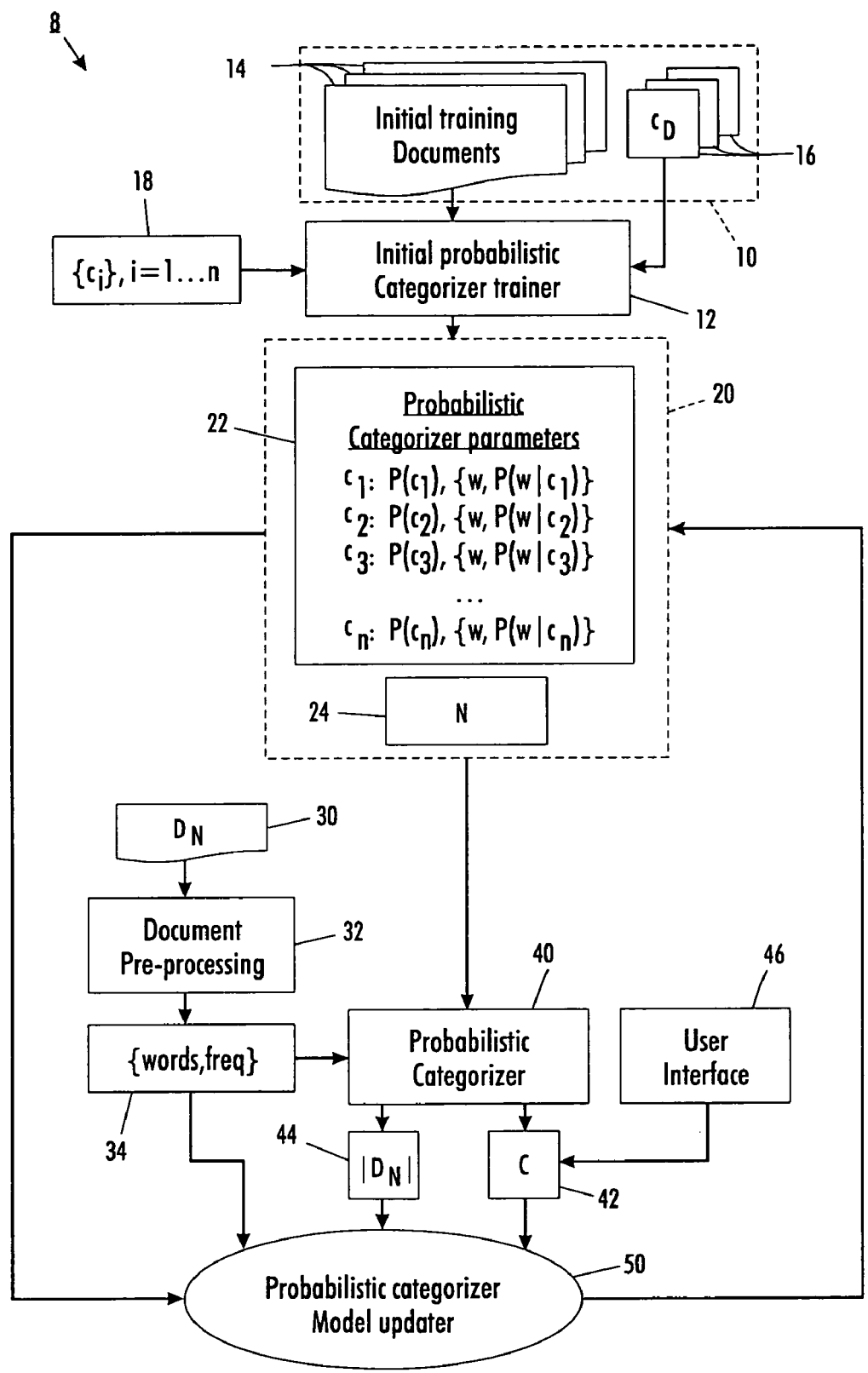
FIG. 1 diagrammatically illustrates a probabilistic categorizer with incremental updating of the categorization model.

With reference to FIG. 1, in a probabilistic categorizer 8 with incremental updating, a collection of annotated documents 10 are input to an initial probabilistic categorizer training module 12. The collection of annotated documents include the documents 14 (or suitable representations thereof, such as "bag of words" or word frequency vector representations of the text of the documents) annotated by pre-determined category assignments 16 selected from a set of categories 18 that are also input to the probabilistic categorizer training module 12. The trainer 12 trains the probabilistic categorizer 8. In the illustrated embodiments, the probabilistic categorizer is a probabilistic latent categorizer (PLC). However, the incremental updating and training techniques disclosed herein are readily adapted to other probabilistic categorization models such as Naïve Bayes-type categorization models.

PLC is a co-occurrence model employing three types of probabilistic categorizer parameters: category probabilities P(c) associated with corresponding categories of the set of categories 18, category conditional document probabilities P(d|c), and category conditional word probabilities or category profiles, P(w|d). The maximum likelihood solution for these three types of probabilistic categorizer parameters is:

$$P(c) = \frac{N_c}{N},$$
$$P(d \mid c) = \frac{|d|}{N_c},$$
$$P(w \mid c) = \frac{N_{wc}}{N_c},$$
(1)

where N is the collection size parameter (typically equal to the number of occurrences or instances of vocabulary words in the collection of documents 10, where multiple repetitions of a particular vocabulary word in a document count as multiple instances of the vocabulary word), $N_c$, is the number of instances of vocabulary words in all documents belonging to category "c", |d| is the total number of instances of vocabulary words in document "d", and $N_{wc}$ is the number of occurrences or instances of a particular vocabulary word "w" in documents belonging to the category "c".

The collection of annotated documents 10 is provided to the trainer 12 all at one time, that is, as a group; accordingly, the initial probabilistic categorizer trainer 12 suitably performs the training in an "off-line" or batch mode, in which the initial probabilistic categorizer trainer 12 has immediate access to the full corpus of the complete collection of annotated initial training documents 10. The output of the training includes probabilistic categorizer parameters given by the ratios of selected frequencies of words such as are set forth in Equation (1).

As part of the training process, the initial probabilistic categorizer trainer 12 builds the vocabulary of words. One suitable approach is as follows. For each document, a common-word filter removes common words unlikely to be indicative of category (such as "the", "each", "for", or so forth). Alternatively or additionally, words having less than a selected number of letters (e.g., less than 3 letters) are filtered out, since short words tend to be common words that are usually unsuitable for use in categorization. The probabilistic categorizer trainer 12 tracks the remaining unfiltered words. When an unfiltered word is identified as occurring in more than a threshold number of the documents of the collection of documents 10, such as in more than three documents for example, then that word is added to the vocabulary. In a modified approach, rather than filtering out common words, a lexico-syntactical analysis is performed on each document to identify noun or verb parts of speech, and when a noun or verb occurs in more than the threshold number of documents it is added to the vocabulary. The skilled artisan can readily employ other techniques for building a suitable vocabulary of words from the collection of documents 10 for use in categorization.

Once the vocabulary is established, and given full access to the entire corpus of initial training documents 10, it is straightforward to compute: |d| which denotes the number of instances of vocabulary words for each document of the collection of annotated documents 10; the collection size parameter N computed as the total number of instances of vocabulary words in all of the documents 10 (that is, $N=\Sigma|d|$ where the summation is over all of the annotated documents 10); the category word counts $N_c$ which are, for each category "c" of the set of categories 18, the total number of instances of vocabulary words in all of the documents 10 that are annotated as belonging to category "c"; and the category conditional word counts $N_{wc}$ which are, for each vocabulary word "w" indicative of the category "c", the total number of instances or occurrences of the vocabulary word "w" in the documents belonging to category "c". The probabilities of Equation (1) are then readily computed from these word counts or frequencies N, $N_c$, $N_{wc}$, and |d|.

The output of the initial probabilistic categorizer trainer 12 is a categorization model 20 which includes the probabilistic categorization parameters 22 given initially by Equation (1) computed from the collection of documents 10, and the collection size parameter N 24 which initially equals the total count of instances of vocabulary words in all of the initial training documents 10. More generally, the collection size parameter N 24 is indicative of an effective total number of instances of vocabulary words in the collection of documents.

For each category, such as category $c_1$, the probabilistic categorization parameters include the category probability values, such as $P(c_1)$ for category $c_1$, and a set of category conditional word probabilities, denoted in FIG. 1 as {w,P(w|$c_1$)} for category $c_1$, where the set notation "{ }" indicates a set of all vocabulary words "w" associated with category $c_1$, with each vocabulary word "w" having an associated category conditional word probability value denoted P(w|$c_1$).

Once trained, the probabilistic categorizer is suitably applied to categorize new documents, such as the example new document $D_N$ 30. Depending upon the formatting of the new document $D_N$ 30, it may be processed by document pre-processing 32 to convert the document $D_N$ 30 into a suitable representation 34, such as a "bag of words" or word frequency vector representation. The document representation 34 is input to a probabilistic categorizer 40 which uses a PLC categorization method in conjunction with the categorization model 20 to annotate the new document $D_N$ 30 with a category C 42. (The capital letter "C" will be used herein to denote the specific category of the set of categories 18 selected to annotate the new document $D_N$ 30, while lower case "c" will be used to denote other categories). Typically, the probabilistic categorizer 40 also outputs the word count |$D_N$| 44 which is equal to the number of instances of vocabulary words in the new document $D_N$ 30, since this quantity is computed during the PLC analysis of the new document $D_N$ 30. Optionally, a user accessing a user interface 46 verifies and may revise the selection of category C for the new document $D_N$ 30.

A probabilistic categorizer model updater 50 updates the categorization model 20 to reflect the addition of the new document $D_N$ 30 to the collection of documents categorized by the PLC. The updating performed by the updater 50 is based on the number of vocabulary words $|D_N|$ 44 in the new document $D_N$ 30, vocabulary words contained in the new document $D_N$ 30, the category C 42 of the new document $D_N$ 30, and the collection size parameter N 24. For an exact update, the collection size parameter N 24 should be updated according to:

$$N^{(t+1)} \leftarrow N^{(t)} + |D_N| \qquad (2),$$

where the superscript "(t)" indicates the value before updating of the categorization model 20 to reflect addition of the new document $D_N$ 30, and the superscript "(t+1)" indicates the value after updating of the categorization model 20 to reflect addition of the new document $D_N$ 30. The word count $N_C$ for the category C to which the new document $D_N$ 30 belongs is similarly updated as:

$$N_C^{(t+1)} \leftarrow N_C^{(t)} + |D_N| \qquad (3).$$

The word counts $N_c$ for the categories of the set of categories 18 other than the category C are unchanged, that is:

$$N_c^{(t+1)} \leftarrow N_c^{(t)}, \forall c \neq C \qquad (4).$$

The number of occurrences of a vocabulary word "w" in documents belonging to the category C to which the new document $D_N$ 30 belongs, that is, $N_{wC}$, is updated as:

$$N_{wC}^{(t+1)} \leftarrow N_{wC}^{(t)} + N_{wD} \qquad (5),$$

where the parameter $N_{wD}$ is the number of occurrences of the vocabulary word "w" in the new document $D_N$ 30.

The categorizer model 20 typically does not store the vocabulary word counts or frequencies $N_C$, $N_c$, and $N_{wC}$. Rather, the categorizer model 20 stores the probabilistic categorizer parameters P(C), P(c), and P(w|C), and the collection size parameter N 24. Accordingly, rather than computing the word frequencies of Equations (2)-(5), in some embodiments the category probability values P(C) and P(c) are computed exactly without recomputing the word frequencies, using recursive averaging formulas, to generate the updates:

$$P(C)^{(t+1)} \leftarrow \frac{N^{(t)}}{N^{(t)} + |D_N|} \cdot P(C)^{(t)} + \frac{|D_N|}{N^{(t)} + |D_N|}, \qquad (6)$$

and $$P(c)^{(t+1)} \leftarrow \frac{N^{(t)}}{N^{(t)} + |D_N|} \cdot P(c)^{(t)}, \quad \forall c \neq C. \qquad (7)$$

Similarly, the category conditional word probability values P(w|C) are updated as:

$$P(w|C)^{(t+1)} \leftarrow (1 - P(D_N|C)^{(t+1)}) \cdot P(w|C)^{(t)} + \frac{N_{wD}}{|D_N|} \cdot P(D_N|C)^{(t+1)}, \qquad (8)$$

where the category conditional document probability $P(D_N|C)^{(t+1)}$ is given by:

$$P(D_N|C)^{(t+1)} \leftarrow \frac{|D_N|}{P(C)^{(t+1)} \cdot (N^{(t)} + |D_N|)}. \qquad (9)$$

Also, for previous documents other than $D_N$ (denoted herein as documents "d"), the category conditional document probability P(d|C) is adjusted as:

$$P(d|C)^{(t+1)} \leftarrow (1 - P(D_N|C)^{(t+1)}) \cdot P(d|C)^{(t)}, \forall d \neq D_N \qquad (10).$$

The categorizer model 20 stores the probabilistic categorizing parameters 22 and the collection size parameter 24; the only additional information needed to perform the updating of Equation (2) and Equations (6)-(10) is the statistical information about the document $D_N$ 30, that is, the word count $|D_N|$ 44 and category conditional word probability values P(w|C).

By updating the probabilistic categorizer parameters 22 to reflect addition of the new document $D_N$ 30 to the collection of documents using Equations (6)-(10) without recomputing the frequencies of words defining the probabilistic categorizer parameters, the updating of the categorization model 20 is computationally efficient and does not require storing the entire corpus of the collection of documents. As seen in Equations (6)-(10), the updating uses ratios of the collection size parameter N 24 and selected word frequencies derived from the new document $D_N$ 30 (such as the word frequency $|D_N|$) to scale the updating respective to the selected frequencies of vocabulary words in the collection of documents (such as the category frequencies $N_C$ and $N_c$).

The updating for the PLC categorizer given by Equation (2) and Equations (6)-(10) is exact, giving the same result as if the new document $D_N$ 30 had been initially included in the collection of documents 10. Moreover, the updating process performed by the updater 50 can be repeated each time another new document is categorized, so as to incrementally update the categorizer model 20 as each new document is categorized. However, the probabilistic categorizer model updater 50 of FIG. 1 does not update the vocabulary.

As the number of documents in the collection of documents is increased by each incremental updating performed by the updating of Equation (2) and Equations (6)-(10), the effect of each new document decreases. The reduced effect of new documents is due to the increase in the value of the collection size parameter N 24 and in the value of $N_C$ each time a new document is added, which causes the ratio $|D_N|/N$ to decrease asymptotically as N becomes large.

In some categorizing applications, it may be advantageous to bias the probabilistic categorizer parameters 22 toward more recent documents. For example, in the medical field, the prevalence of certain vocabulary words may drift over time as older treatments, medical procedures, and so forth become obsolete and newer treatments, procedures, and so forth take their place. The vocabulary word "penicillin", for example, may become less prevalent in medical literature over time as pathogenic bacteria become penicillin-resistant, while other antibiotics for which bacteria have not developed resistance take the place of penicillin.

Hence, in some embodiments the updating of Equations (2) and (6)-(10) is modified to bias the probabilistic categorizer parameters toward more recent documents. One approach for such biasing is to hold the collection size parameter N 24 constant. This can be done in various ways. If the initial training documents 10 present a large enough database, it may be advantageous to fix the collection size parameter N 24 constant at the value output by the initial probabilistic categorizer trainer 12. On the other hand, if the initial training documents 10 is a relatively small database, it may be advantageous to allow the collection size parameter N 24 to increase in accordance with Equation (2) due to incremental updating by the probabilistic categorizer model updater 50 until it reaches a selected maximum value, after which it is held constant at that selected maximum value.

When the collection size parameter N 24 becomes constant (either immediately after the initial training or after incremental updating increases the collection size parameter N 24 to the selected maximum value), then further additions to the vocabulary word counts N, $N_c$, and $N_C$ are discounted by a factor of $(N^{(t)}-|D_N|)/N^{(t)}$ before adding the any additional count from the new document $D_N$ 30, yielding:

$$N^{(t+1)} \leftarrow \left[\frac{N^{(t)} - |D_N|}{N^{(t)}} \cdot N^{(t)}\right] + |D_N|, \qquad (11)$$

which simplifies to $N^{(t+1)} \leftarrow N^{(t)}$. The category word frequencies and category conditional word frequencies are suitably expressed as:

$$N_C^{(t+1)} \leftarrow \left[\frac{N^{(t)} - |D_N|}{N^{(t)}} \cdot N_C^{(t)}\right] + |D_N|, \qquad (12)$$

$$N_c^{(t+1)} \leftarrow \left[\frac{N^{(t)} - |D_N|}{N^{(t)}} \cdot N_c^{(t)}\right], \quad \forall c \neq C, \qquad (13)$$

and:

$$N_{wC}^{(t+1)} \leftarrow \left[\frac{N^{(t)} - |D_N|}{N^{(t)}} \cdot N_{wC}^{(t)}\right] + N_{wD}. \qquad (14)$$

By holding the collection size parameter N 24 constant by discounting the pre-adjustment counts by the factor of $(N^{(t)}-|D_N|)/N^{(t)}$, at each incremental update the influence of past documents decreases by the factor $(N^{(t)}-|D_N|)/N^{(t)}$. The effect of older documents on the categorization model 20 is reduced as new documents are added. Based on Equations (12)-(14), and denoting $N^{(t+1)}=N^{(t)}=N$, the probabilistic categorizer parameters of Equations (6)-(10) are modified as follows:

$$P(C)^{(t+1)} \leftarrow \frac{N - |D_N|}{N} \cdot P(C)^{(t)} + \frac{|D_N|}{N}, \qquad (15)$$

$$P(c)^{(t+1)} \leftarrow \frac{N - |D_N|}{N} \cdot P(c)^{(t)}, \quad \forall c \neq C, \qquad (16)$$

$$P(w|C)^{(t+1)} \leftarrow \qquad (17)$$
$$(1 - P(D_N|C)^{(t+1)}) \cdot P(w|C)^{(t)} + \frac{N_{wD}}{|D_N|} \cdot P(D_N|C)^{(t+1)},$$

and:

$$P(d|C)^{(t+1)} \leftarrow (1 - P(D_N|C)^{(t+1)}) \cdot P(d|C)^{(t+1)}, \quad \forall d \neq D_N, \qquad (18)$$

where in Equations (17) and (18) the conditional document probability $P(D_N|C)^{(t+1)}$ is given by:

$$P(D_N|C)^{(t+1)} \leftarrow \frac{|D_N|}{N \cdot P(C)^{(t+1)}}. \qquad (19)$$

The updating of Equations (15)-(19) approximates, but is not precisely equivalent to, training on the most recent documents (including $D_N$ 30) containing the last N words. The updating of Equations (15)-(19) allows the categorization model 20 to follow category drift. If the frequencies of certain vocabulary words used in documents of a certain category evolve over time, the profile $P(w|C)$ will be updated faster using Equations (15)-(19) as compared with using Equations (6)-(10), because the document probability value $P(D_N|C)$ does not decrease over time in the former case.

As noted previously, the probabilistic categorizer model updater 50 of FIG. 1 does not update the vocabulary. Rather, the vocabulary is established by the initial training performed by the trainer 12, and thereafter does not change. However, in some categorizing applications, it may be advantageous to add new vocabulary words during the incremental updating. Using the medical field example provided previously, for example, as penicillin becomes less effective due to increased bacterial resistance, completely new antibiotics may be developed. The names of these new antibiotics may not have been prevalent enough in the initial training documents 10 to have been identified as vocabulary words during the initial training. Indeed, such new antibiotics may not even have existed at the time of initial training. Thus, in such a circumstance it is advantageous to be able to add new vocabulary words during the incremental updating.

Figure 2:
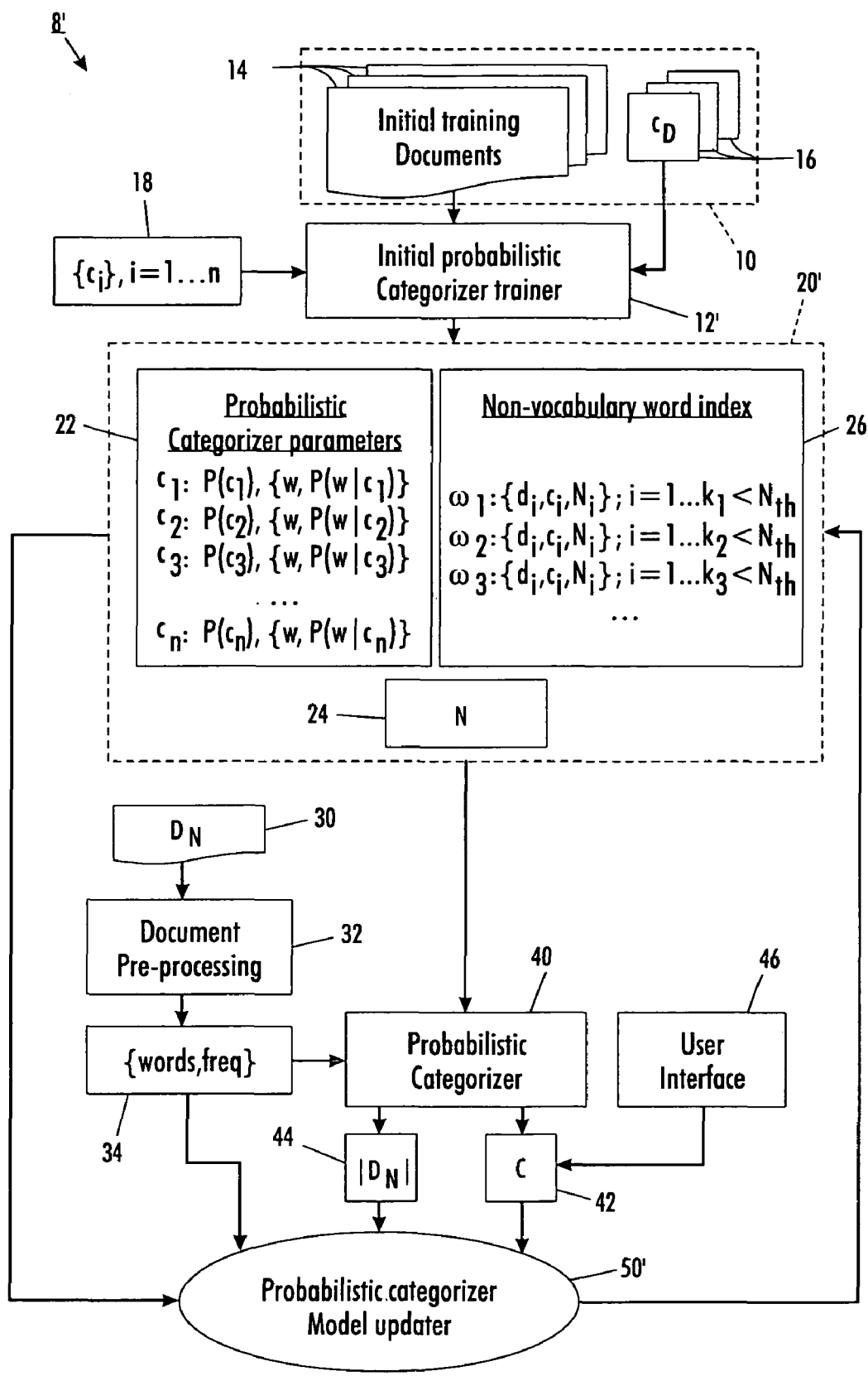
FIG. 2 diagrammatically illustrates a probabilistic categorizer with incremental updating of the categorization model including incremental training of the model to add new vocabulary words.

With reference to FIG. 2, a probabilistic categorizer 8' is described, which has incremental updating of a categorization model 20' including incremental training of the categorization model 20' to add new vocabulary words. The collection of annotated documents 10 are processed by the initial probabilistic categorizer training module 12' to produce the categorization model 20' including the probabilistic categorizer parameters 22 and the collection size parameter 24. The categorizer training module 12' of FIG. 2 differs from the categorizer training module 12 of FIG. 1 in that the categorizer training module 12' additionally outputs a non-vocabulary words index 26, which indexes potential vocabulary words X that occurred at least once in the initial training documents 10, but which did not occur often enough to be identified as vocabulary words. In FIG. 2, a word is selected as a vocabulary word (denoted "w") when it occurs at least a threshold $N_{th}$ number of documents. For example, if $N_{th}=3$, then a word which occurs in only one or two documents will not be selected as a vocabulary word. Rather, it will be listed in the non-vocabulary words index 26 as a non-vocabulary word ω, along with a set of information $\{d_i,c_i,N_i\}$ where the integer i indexes a document $d_i$, containing the word ω, $c_i$ identifies the categorization of the document $d_i$, and $N_i$ is the count of the number of occurrences of the word ω in the document $d_i$. The rationale for this approach in defining the vocabulary is that according to Zipf's law, most words have low frequency while at the same time these words are not very informative about the categorization task. Omitting low-frequency words from the vocabulary saves storage space and processing time, and may remove some noise from the categorization process.

The non-vocabulary words index 26 may index all non-vocabulary words in the initial training documents 10; however, this approach can become memory intensive and computationally inefficient, since some non-vocabulary words may be of a type unlikely to be useful in categorization. In other embodiments, the non-vocabulary words index 26 does not include non-vocabulary words that are unlikely to be suitable for categorization. For example, words shorter than a certain number of letters may be omitted, or common generic words like "the", "another", "rather", "only", and so forth may be omitted.

In some embodiments, it is contemplated to store the entire corpus of the collection of documents used in constructing the categorization model 20', keeping track of the word frequencies for non-vocabulary words. When an incoming document puts a non-vocabulary word above the threshold for addition to the vocabulary, the corresponding P(w|c) is computed from the corpus and the P(d|c) probability values are updated accordingly. However, storing the full corpus is expensive, and each update is in general computationally intensive since it requires going back to the corpus and repeating part of the training.

Accordingly, in FIG. 2 this memory- and computation-intensive approach is improved through the use of the non-vocabulary word index 26. The categorization update processing for the new document $D_N$ 30 is performed by the probabilistic categorizer model updater 50' in two operations. A first operation is performed as previously described, and updates the categorization model 20 to account for words contained in the new document $D_N$ 30 which are already included in the vocabulary. The second operation searches for new words to add to the vocabulary. Words to be added are those non-vocabulary words that have already occurred in $N_{th}-1$ previous documents as indicated in the non-vocabulary word index 26, and that now occur for the $N_{th}$ time in the new document $D_N$ 30. If there are no new vocabulary words in the new document $D_N$ 30, then the updating is complete.

On the other hand, if a new vocabulary word is identified, further updating of the categorization model 20, including updating the vocabulary, is performed. To provide a quantitative example of such further updating, the example threshold value $N_{th}=3$ will be used, and $N_{WD}$ is used to denote the number of occurrences of the new word in the new document $D_N$ 30 which is to be added to the vocabulary. The new word has occurred in two previous documents $d_1$ and $d_2$ with frequencies $N_{W1}$ and $N_{W2}$, respectively. The document $D_N$ 30 is annotated as category C, while the two previous documents $d_1$ and $d_2$ are annotated as categories $c_1$ and $c_2$, respectively. The occurrence of the word in the new document $D_N$ 30 causes the non-vocabulary word index entry for that word to reach the threshold value $N_{th}=3$; hence, the word is removed from the non-vocabulary word index 26 and added to the vocabulary. Additionally, the collection size parameter N 24 is updated as:

$$N^{(\tau+1)} \leftarrow N^{(\tau)} + N_{W1} + N_{W2} + N_{WD} \qquad (20),$$

and the probabilistic categorizer parameters P(C), P($c_1$), P($c_2$), and P(c) are updated as follows:

$$P(C)^{(\tau+1)} \leftarrow \frac{N^{(\tau)}}{N^{(\tau)} + N_{W1} + N_{W2} + N_{WD}} \cdot P(C)^{(\tau)} + \frac{N_{WD}}{N^{(\tau)} + N_{W1} + N_{W2} + N_{WD}}, \qquad (21)$$

$$P(c_1)^{(\tau+1)} \leftarrow \frac{N^{(\tau)}}{N^{(\tau)} + N_{W1} + N_{W2} + N_{WD}} \cdot P(c_1)^{(\tau)} + \frac{N_{W1}}{N^{(\tau)} + N_{W1} + N_{W2} + N_{WD}}, \qquad (22)$$

$$P(c_2)^{(\tau+1)} \leftarrow \frac{N^{(\tau)}}{N^{(\tau)} + N_{W1} + N_{W2} + N_{WD}} \cdot P(c_2)^{(\tau)} + \frac{N_{W2}}{N^{(\tau)} + N_{W1} + N_{W2} + N_{WD}}, \qquad (23)$$

and

-continued $$P(c)^{(\tau+1)} \leftarrow \frac{N^{(\tau)}}{N^{(\tau)} + N_{W1} + N_{W2} + N_{WD}} \cdot P(c)^{(\tau)}, \forall c \neq \{C, c_1, c_2\}. \qquad (24)$$

In Equations (20)-(24) the superscript "($\tau$)" indicates values prior to adding the new vocabulary word, while the superscript "($\tau+1$)" indicates values after adding the new vocabulary word. As indicated by Equation (20), in the updating of Equations (20)-(24) the collection size parameter N 24 is not being held constant. That is, Equations (20)-(24) are analogous to Equations (6) and (7) presented previously, but are written for the second operation where a new word is being added to the vocabulary. The document probability values for category C are updated as:

$$P(D|C)^{(\tau+1)} \leftarrow \frac{N^{(\tau)} \cdot P(C)^{(\tau)} \cdot P(D|C)^{(\tau)} + N_{WD}}{N^{(\tau)} \cdot P(C)^{(\tau)} + N_{WD}}, \qquad (25)$$

$$P(d|C)^{(\tau+1)} \leftarrow \frac{N^{(\tau)} \cdot P(C)^{(\tau)}}{N^{(\tau)} \cdot P(C)^{(\tau)} + N_{WD}} \cdot P(D|C)^{(\tau)}, \forall d \neq D, \qquad (26)$$

and similarly for the document probability values for ($d_1,c_1$) and ($d_2,c_2$). The document probabilities for all $c \notin \{C,c_1,c_2\}$ are unchanged by addition of the new word to the vocabulary of words. The category conditional word probabilities for the category C are updated as:

$$P(W|C)^{(\tau+1)} \leftarrow \frac{N_{WD}}{(N^{(\tau)} + N_{W1} + N_{W2} + N_{WD}) \cdot P(C)^{(\tau+1)}}, \qquad (27)$$

$$P(w|C)^{(\tau+1)} \leftarrow (1 - P(W|C)^{(\tau+1)}) \cdot P(w|C)^{(\tau)}, \forall w \neq W, \qquad (28)$$

and similarly for the categories $c_1$ and $c_2$, using $N_{W1}$ and $N_{W2}$, respectively. Again, the only information employed in Equations (20)-(28), apart from the previous values of the probabilistic categorizer parameters and the collection size parameter N 24, are the three frequencies $N_{W1}$, $N_{W2}$, and $N_{WD}$ for the documents $d_1$, $d_2$, and $D_N$ 30, respectively. The frequencies $N_{W1}$, $N_{W2}$ are extracted from the non-vocabulary word index 26, while the frequency $N_{WD}$ is derived from the available new document $D_N$ 30. The skilled artisan can readily derive update formulas analogous to Equations (21)-(28) in the case where the collection size parameter N 24 is held constant (i.e., where $N^{(\tau+1)}=N^{(\tau)}=N$).

In FIG. 2, the probabilistic categorizer model updater 50' is capable of adding words to the vocabulary. Accordingly, in some such embodiments, the initial probabilistic categorizer trainer 12' is omitted, and the probabilistic categorizer parameters 20' are determined by incremental updating performed by feeding the initial training documents 14 into the probabilistic categorizer model updater 50' in a sequential manner rather than in a batch manner. However, the reliability and stability of the categorizer will generally be poor until a number of such sequential updates have been performed so as to build up the vocabulary. Hence, an initial off-line or batch-mode training stage as illustrated in FIG. 2 is advantageous.

In the illustrated embodiments, each document is annotated by a single category. Those skilled in the art can readily adapt the described embodiments to categorizers that can annotate documents with more than one category. For example, multi-label, multi-class categorization is suitably achieved by replicating each multi-labeled document in several instances, with each instance of the document having a single category label. Thus, if a document is annotated by two categories $C_1$, $C_2$, then the updating performed by the probabilistic categorizer model updater 50 or by the model updater 50' is repeated for two instances of that document: one instance in which the document is annotated by the category "$C_1$", and another instance in which the document is annotated by the category "$C_2$". While the updating is repeated for each category annotation, much of the processing for updating the first category (such as computation of the total document word count $|D_N|$) is reusable in updating the subsequent categories.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for operating a probabilistic document categorizer having an associated vocabulary of words and an associated plurality of probabilistic categorizer parameters derived from a collection of documents, the method comprising:
   receiving a new document;
   converting the new document to a bag-of-words representation; and
   updating the probabilistic categorizer parameters to reflect addition of the new document to the collection of documents based on vocabulary words contained in the bag-of-words representation of the new document, a category of the new document, and a collection size parameter indicative of an effective total number of instances of vocabulary words in the collection of documents.

2. The method as set forth in claim 1, wherein the updating includes:
   increasing the value of the collection size parameter by the number of vocabulary words in the new document.

3. The method as set forth in claim 1, wherein the updating includes:
   identifying a word contained in the new document as a new vocabulary word; and
   adding the new vocabulary word to the vocabulary of words.

4. The method as set forth in claim 3, wherein the updating further includes:
   maintaining a non-vocabulary word index containing words that have occurred in the collection of documents, the identifying of the new vocabulary word referencing the non-vocabulary word index.

5. The method as set forth in claim 4, wherein the maintaining a non-vocabulary word index includes:
   storing for each word of the non-vocabulary word index (i) an indication of the number of documents containing the word, (ii) an indication of the category of each document containing the word, and (iii) a number of occurrences of the word in each document containing the word.

6. The method as set forth in claim 1, wherein the updating includes:
   updating the probabilistic categorizer parameters based on the existing vocabulary of words; and
   conditional upon determining that the new document contains a word to be added to the vocabulary of words, adding the word to the vocabulary of words and further updating the probabilistic categorizer parameters to reflect the addition of the word to the vocabulary of words.

7. The method as set forth in claim 6, wherein the updating further includes:
   determining that the new document contains a word to be added to the vocabulary of words by identifying the word in a non-vocabulary word index as having occurred in one less than a threshold number of documents of the collection of documents prior to addition of the new document.

8. The method as set forth in claim 1, wherein the probabilistic document categorizer is a probabilistic latent categorizer (PLC), and the updating includes:
   updating the probabilistic categorizer parameters including a category probability value and one or more category conditional word probability values for each category of the PLC.

9. The method as set forth in claim 1, wherein the new document is annotated by a plurality of categories, and the updating includes:
   repeating the updating for a plurality of instances of the new document in which each instance is annotated by one of the plurality of categories.

10. The method as set forth in claim 9, wherein the repeating of the updating for a plurality of instances of the new document includes:
    reusing common parameters of the plurality of instances including at least the total number of vocabulary words in the new document.

11. The method as set forth in claim 1, wherein the receiving the new document further comprises:
    determining the category for labeling the new document, using vocabulary words contained in the new document and the plurality of probabilistic categorizer parameters.

12. The method as set forth in claim 11, further comprising:
    receiving an additional new document;
    determining one or more categories for labeling the additional new document, using vocabulary words contained in the additional new document and the plurality of probabilistic categorizer parameters updated to reflect addition of the new document to the collection of documents.

13. The method as set forth in claim 12, further comprising:
    biasing the plurality of probabilistic categorizer parameters towards the additional new document.

14. A method for operating a probabilistic document categorizer having an associated vocabulary of words and an associated plurality of probabilistic categorizer parameters derived from a collection of documents, the method comprising:
    receiving a new document; and
    updating the probabilistic categorizer parameters to reflect addition of the new document to the collection of documents based on vocabulary words contained in the new document, a category of the new document, and a collection size parameter indicative of an effective total number of instances of vocabulary words in the collection of documents, wherein the updating does not change the value of the collection size parameter.

15. The method as set forth in claim 14, wherein the updating includes:
    keeping the collection size parameter constant; and
    discounting each probabilistic categorizer parameter based on a ratio of:

(i) a difference between the collection size parameter and the total number of vocabulary words in the new document, and (ii) the collection size parameter, the discounting accounting for the addition of the new document to the collection of documents while keeping the collection size parameter constant.

16. The method as set forth in claim 14, further comprising:

converting the new document to a bag-of-words representation, the updating operating on the bag-of-words representation of the new document.

17. The method as set forth in claim 14, wherein the probabilistic document categorizer is a probabilistic latent categorizer (PLC), and the updating includes:

updating the probabilistic categorizer parameters including a category probability value and one or more category conditional word probability values for each category of the PLC.

18. A method for operating a probabilistic document categorizer having an associated vocabulary of words and an associated plurality of probabilistic categorizer parameters derived from a collection of documents, wherein the probabilistic document categorizer is a probabilistic latent categorizer (PLC), the method comprising:

receiving a new document; and updating the probabilistic categorizer parameters to reflect addition of the new document to the collection of documents based on vocabulary words contained in the new document, a category of the new document, and a collection size parameter indicative of an effective total number of instances of vocabulary words in the collection of documents, wherein the updating includes updating the collection size parameter denoted by N in accordance with:

$$N^{(t+1)} \leftarrow N^{(t)} + |D_N|$$

where $|D_N|$ denotes a total number of vocabulary words in the new document and superscripts (t) and (t+1) denote values before and after the updating, respectively, and updating the category probability values in accordance with:

$$P(C)^{(t+1)} \leftarrow \frac{N^{(t)}}{N^{(t)} + |D_N|} \cdot P(C)^{(t)} + \frac{|D_N|}{N^{(t)} + |D_N|}$$

and $$P(c)^{(t+1)} \leftarrow \frac{N^{(t)}}{N^{(t)} + |D_N|} \cdot P(c)^{(t)}, \forall\, c \neq C$$

where P(C) denotes the category probability for the category of the new document and P(c) denotes category probabilities for categories other than the category of the new document.

19. A method for operating a probabilistic document categorizer having an associated vocabulary of words and an associated plurality of probabilistic categorizer parameters derived from a collection of documents, wherein the probabilistic document categorizer is a probabilistic latent categorizer (PLC), the method comprising:

receiving a new document; and updating the probabilistic categorizer parameters to reflect addition of the new document to the collection of documents based on vocabulary words contained in the new document, a category of the new document, and a collection size parameter indicative of an effective total number of instances of vocabulary words in the collection of documents, wherein the updating includes maintaining the collection size parameter at a constant value denoted by N and updating the category probability values in accordance with:

$$P(C)^{(t+1)} \leftarrow \frac{N - |D_N|}{N} \cdot P(C)^{(t)} + \frac{|D_N|}{N}$$

$$P(c)^{(t+1)} \leftarrow \frac{N - |D_N|}{N} \cdot P(c)^{(t)}, \forall\, c \neq C$$

where $|D_N|$ denotes a total number of vocabulary words in the new document, P(C) denotes the category probability for the category of the new document, P(c) denotes category probabilities for categories other than the category of the new document, and superscripts (t) and (t+1) denote category probability values before and after the updating, respectively.

* * * * *